US007515189B2

(12) United States Patent
Slagle

(10) Patent No.: US 7,515,189 B2
(45) Date of Patent: Apr. 7, 2009

(54) RANDOM-SCAN, RANDOM PIXEL SIZE IMAGING SYSTEM

(75) Inventor: Glenn B. Slagle, McLean, VA (US)

(73) Assignee: The United States of America as represented by the Department of the Army, Washington, DC (US)

( * ) Notice: Subject to any disclaimer, the term of this patent is extended or adjusted under 35 U.S.C. 154(b) by 659 days.

(21) Appl. No.: 11/217,853

(22) Filed: Sep. 1, 2005

(65) Prior Publication Data

US 2007/0047044 A1 Mar. 1, 2007

(51) Int. Cl.
*H04N 5/335* (2006.01)

(52) U.S. Cl. .................................. 348/315; 348/333.08

(58) Field of Classification Search ................. 348/315, 348/314, 311, 333.08; 345/32
See application file for complete search history.

(56) References Cited

U.S. PATENT DOCUMENTS 4,574,311 A * 3/1986 Resnikoff et al. ........... 348/315
4,601,537 A * 7/1986 Saccocio .................... 385/116
4,602,289 A * 7/1986 Sekine ....................... 348/315
5,074,683 A * 12/1991 Tarn et al. .................... 385/120
6,104,371 A * 8/2000 Wang et al. ................. 345/102
6,744,543 B1 * 6/2004 Keithley ..................... 358/514
6,933,976 B1 * 8/2005 Suzuki ....................... 348/315
7,297,931 B2 * 11/2007 Krantz et al. .......... 250/227.14
2002/0096629 A1 * 7/2002 Korein .................. 250/227.11
2002/0180877 A1 * 12/2002 Kikuchi ...................... 348/315
2003/0112349 A1 * 6/2003 Berstis ....................... 348/241

* cited by examiner

*Primary Examiner*—Nhan T Tran
*Assistant Examiner*—Amy Hsu
(74) *Attorney, Agent, or Firm*—Andrew Romero; John Raubitschek; William Anderson

(57) ABSTRACT

Described is a method of image dissection that utilizes random, non-rectangular scan patterns and irregular size and shape picture elements. To do this, matched faceplates would be cut from a fused scrambled fiber optic bundle with fibers of random diameters and cross sections. One faceplate would be placed in contact with the imager focal plane surface. The other faceplate would be placed in contact with the light-emitting surface of the display device. Thus, the images input and output from the imaging system of the invention would match. A video link would connect the focal plane imager and the raster scan display. The raster scan would be accomplished in a random manner so as to provide the best quality refresh rate and image.

3 Claims, 4 Drawing Sheets

Current Scan Technique

Proposed Scan Technique

RANDOM-SCAN, RANDOM PIXEL SIZE IMAGING SYSTEM

GOVERNMENT INTEREST

The invention described herein may be manufactured, used, sold, imported, and/or licensed by or for the Government of the United States of America.

FIELD OF INTEREST

The invention relates to scanning techniques for analog and digital displays.

BACKGROUND OF THE INVENTION

Almost all video, digital camera, and display systems in use currently employ a scanning technique consisting of rectangular patterns of constant-size picture elements. One of the main disadvantages of this scanning method arises from spatial frequency interference when imaging scenes with linear or curvilinear features and with dimensions or line space at multiples or submultiples of the pixel spacing. This interference can cause gross distortions of the image sometimes requiring very elaborate processing algorithms for image restorations.

The present invention addresses this disadvantage found in the prior art.

SUMMARY OF THE INVENTION

Accordingly, one object of the present invention is to provide a film photography like picture in analog and digital video displays.

The invention accomplishes this objective and others by using a method of image dissection that utilizes random, non-rectangular scan patterns and irregular size and shape picture elements. To do this, matched faceplates would be cut from a fused scrambled fiber optic bundle with fibers of random diameters and cross sections. One faceplate would be placed in contact with the imager focal plane surface. The other faceplate would be placed in contact with the light-emitting surface of the display device. Thus, the images input and output from the imaging system of the invention would match. A video link would connect the focal plane imager and the raster scan display. The raster scan would be accomplished in a random manner so as to provide the best quality refresh rate and image.

BRIEF DESCRIPTION OF THE DRAWINGS

These and other objects of the invention will become readily apparent in light of the Detailed Description Of The Invention and the attached drawings wherein.

DETAILED DESCRIPTION OF THE INVENTION

The invention is a new approach to image dissection and display wherein the display is constructed in such a way that the focal plane/display picture elements are of irregular size and shape, as like the grains of a photographic emulsion. The pixel pattern of the corresponding display device would be an exact duplicate of the imager focal plane. Each of the picture elements (imager and display) would be identically scanned in a predetermined synchronized random fashion.

Since there are no regular scans or patterns associated with this image technique, it will be totally free of spurious resolution, spatial frequency interference and other common image distortions long associated with television-based scanning systems. The image quality should be identical to that associated with photographic film.

By varying the size of each picture element as well as the scan pattern, this technique cures a common image artifact problem with digitized images of slowly varying contrast features (such as shots of sky background showing undesired isophote patterns).

Another advantage of this image dissection technique is security. If the imagers and displays are closely controlled, their images cannot be readily intercepted in readable form. Additionally, they should be relatively immune to deliberate jamming or interference.

Figure 1:
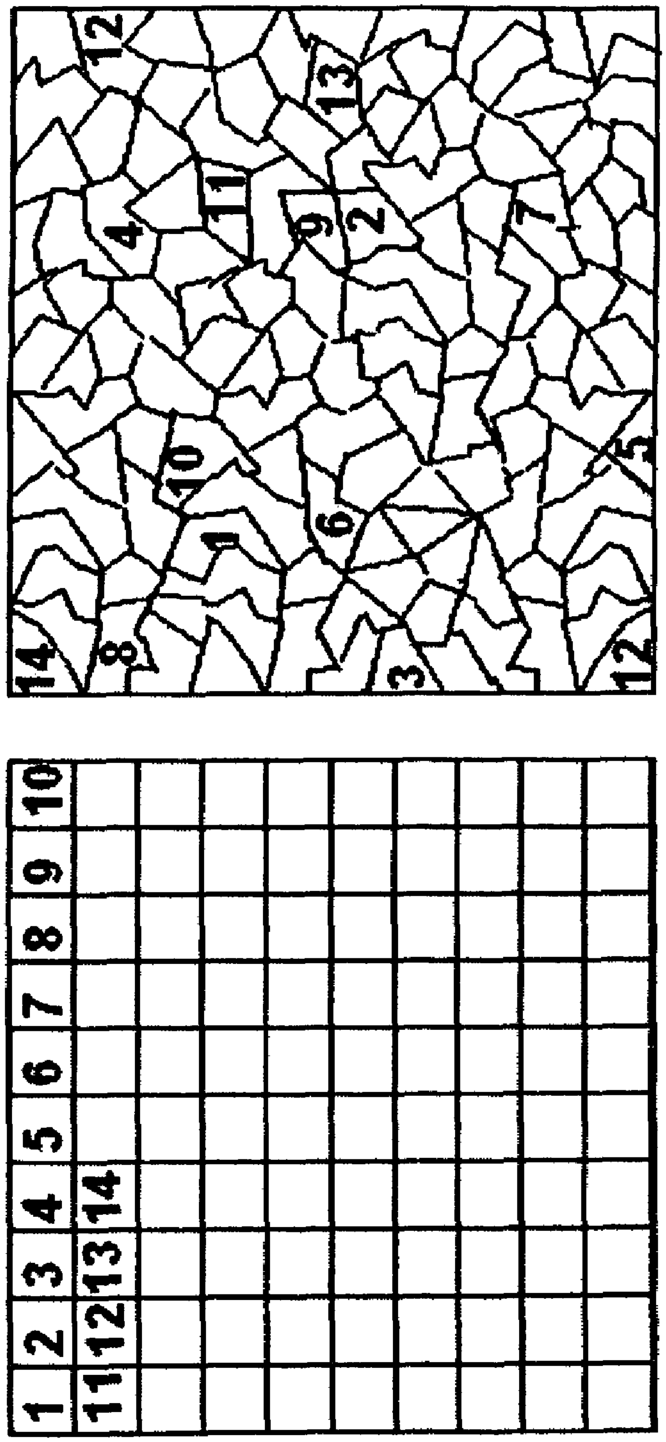
FIG. 1 contrasts the current rectangular digital bitmap scan patterns used both in liquid crystal or plasma displays and MOS-type focal plane imagers with the proposed new image dissection scan pattern.
Figure 2:
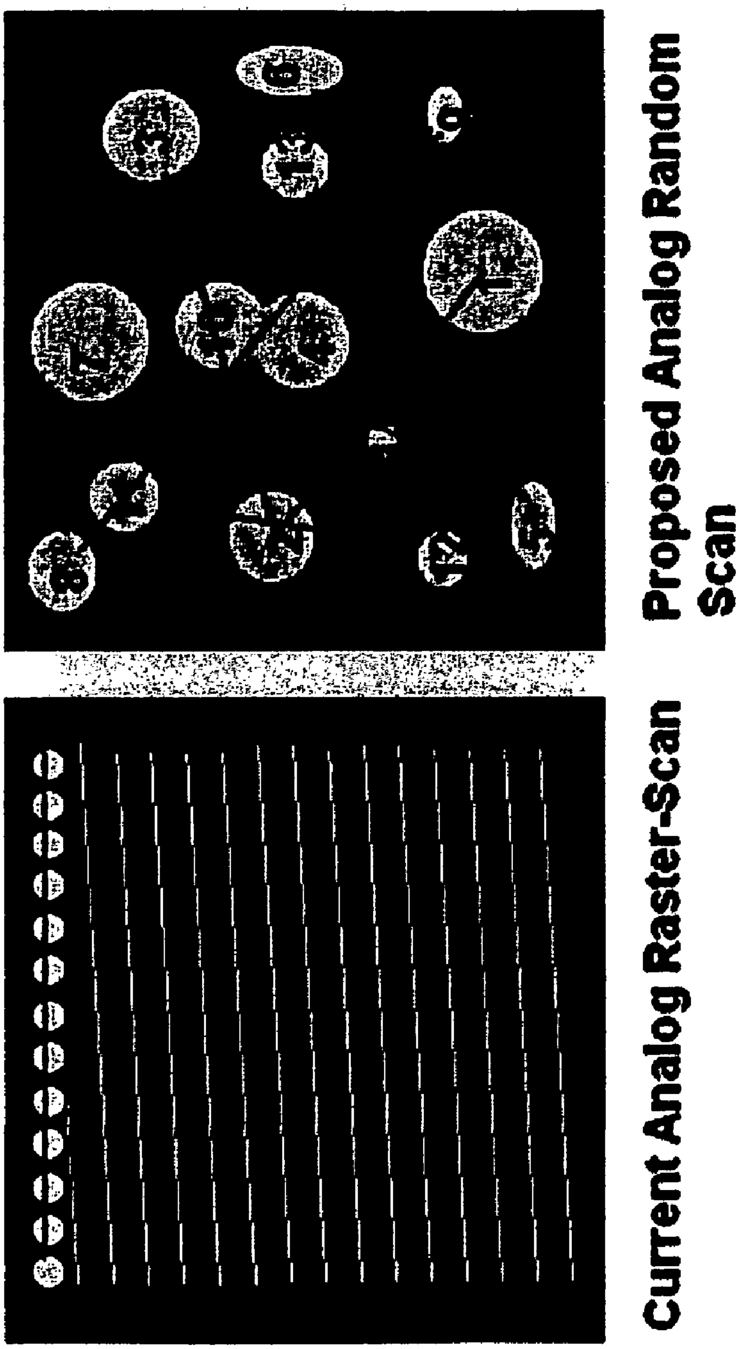
FIG. 2 contrasts the current analog raster scan image dissection technique used in cathode ray tube displays and Image Dissector camera tubes.
Figure 3:
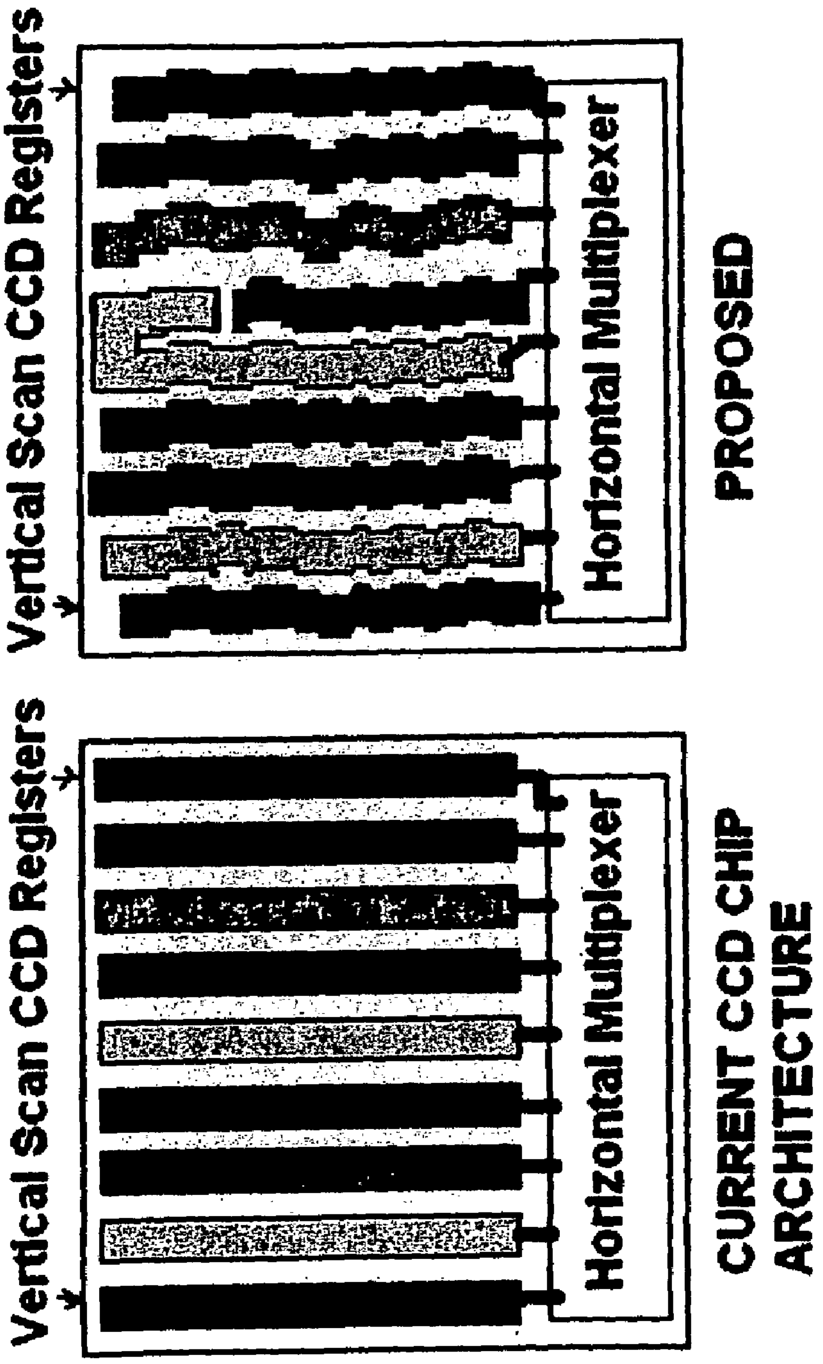
FIG. 3 contrasts current CCD focal plane imager chip architecture with a new proposed architecture capable of supporting the new image dissection technique.
Figure 4:
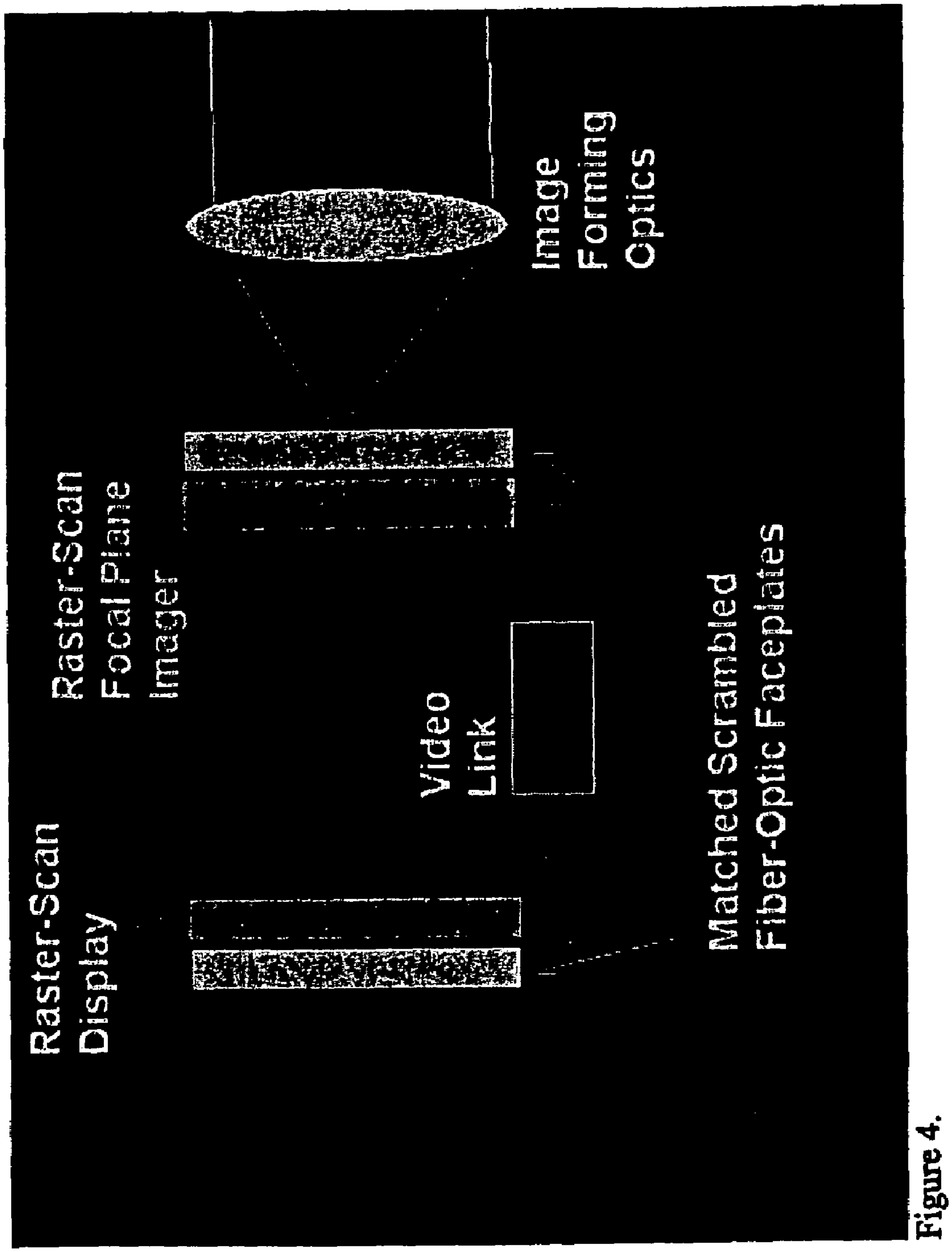
FIG. 4 shows how an existing conventional raster/bitmap displays & imagers could be converted to the new image dissection technique.

FIGS. 1 through 4 illustrate various means and modifications to existing imager technologies to support the new image dissection technique. FIG. 1 contrasts the current rectangular digital bitmap scan patterns used both in liquid crystal or plasma displays and MOS-type focal plane imagers with the proposed new image dissection scan pattern. FIG. 2 contrasts the current analog raster scan image dissection technique used in cathode ray tube displays and Vidicon, Orthicon and Image Dissector camera tubes. A predetermined random scan pattern is generated and applied to the tube X-Y deflection system. This scan pattern also is applied to the tube focus and astigmatism system to vary the size and shape of the scanning electron beam also in a predetermined, synchronized random or pseudo-random fashion. FIG. 3 contrasts current CCD focal plane imager chip architecture with a new proposed architecture capable of supporting the new image dissection technique. The individual vertical scan shift register arrays and their photo-sites are laid out on the CCD chip in a non-liner, non-rectangular random or pseudo-random pattern. The spacing between vertical arrays, array lengths, and photosite size/shape is also random or pseudo random. FIG. 4 shows how an existing conventional raster/bitmap displays & imagers could be converted to the new image dissection technique. Matched faceplates would be cut from a fused scrambled fiber optic bundle with fibers of random diameters and cross sections. One faceplate would be placed in contact with the imager focal plane surface. The other faceplate would be placed in contact with the light-emitting surface of the display device. Thus, the images input and output from the imaging system of the invention would match. A video link would connect the focal plane imager and the raster scan display. As mentioned, the raster scan would be accomplished in a random manner so as to provide the best quality refresh rate and image.

What is claimed is:

1. An imaging system comprising:

image generation means for producing an image;

means for displaying the image comprising a plurality of picture elements where all of the picture elements are of a random size and shape; and means for refreshing the image wherein the image is refreshed over the picture elements in a random fashion, wherein the image generation means comprises image forming optics which focus the image on a raster-scan focal plane imager through a first matched scrambled fiber-optic faceplate; and wherein the display means is a raster-scan display linked to the focal plane imager via a video link and the final display is viewed through a second matched fiber-optic faceplate.

2. An imaging method comprising the steps of:

providing a pair of matched faceplates having irregular size and shape picture elements;

focusing an image through one of the matched faceplates on a raster-scan focal plane imager;

viewing through the other matched faceplate a raster-scan display linked to the focal plane imager via a video link; and using random, non-rectangular raster-scan patterns for the display.

3. The imaging method recited in claim 2 wherein the faceplates providing step includes:

cutting a pair of matched faceplates from a fused scrambled fiber optic bundle having fibers of random diameters and cross sections.

* * * * *